Oct. 4, 1955  T. F. JACOBS  2,719,731
TRUCK HITCH FOR TOWING A VEHICLE BACKWARDS
Filed June 9, 1952  2 Sheets-Sheet 1
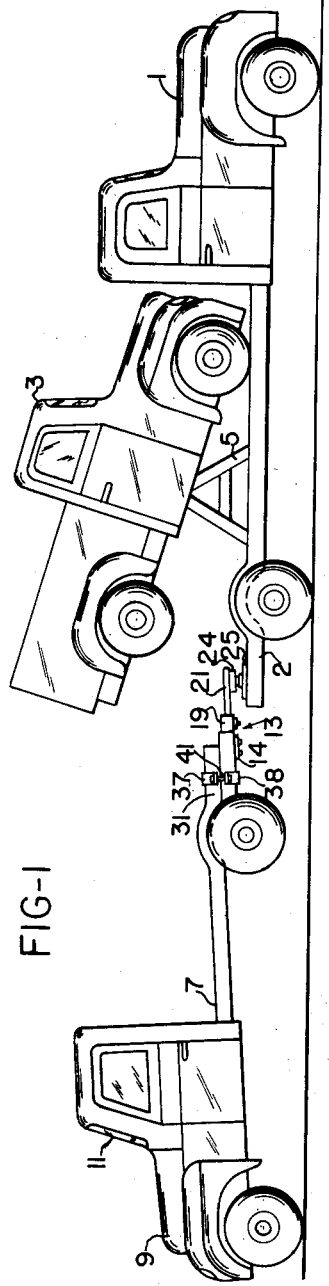
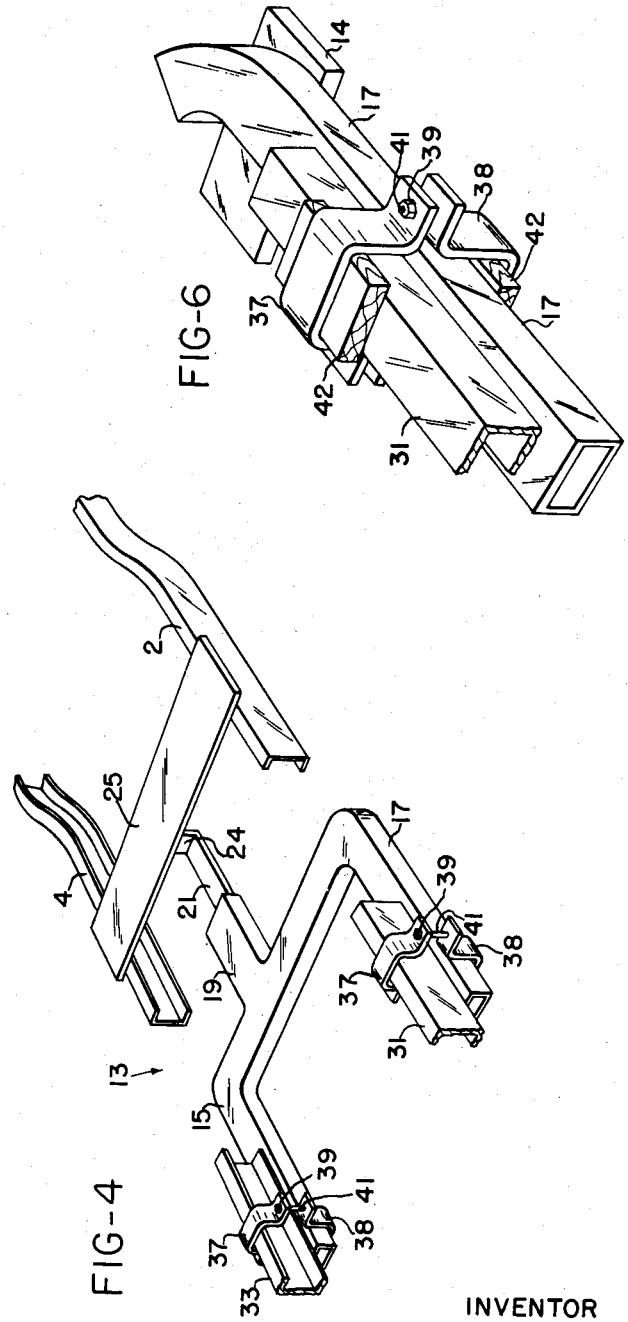
INVENTOR
THOMAS F. JACOBS
BY Toulmin & Toulmin
ATTORNEYS Oct. 4, 1955          T. F. JACOBS          2,719,731
TRUCK HITCH FOR TOWING A VEHICLE BACKWARDS
Filed June 9, 1952          2 Sheets-Sheet 2
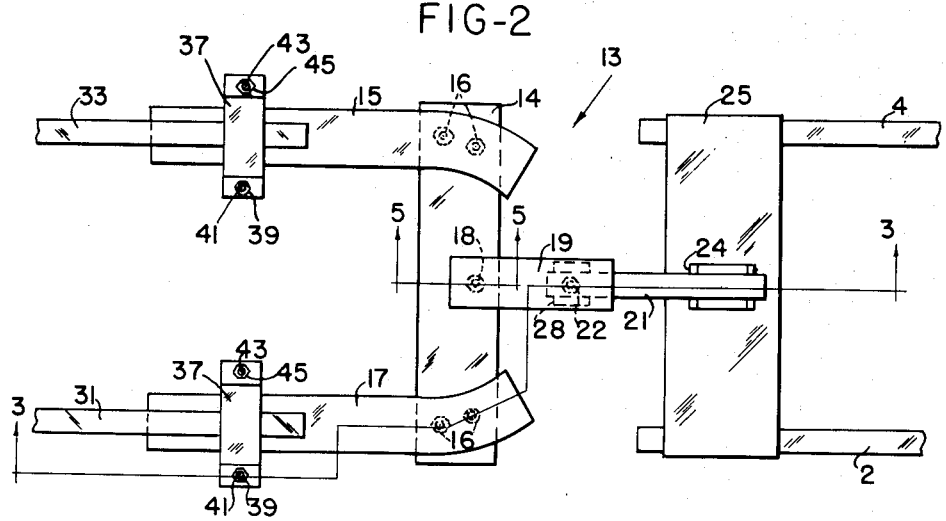
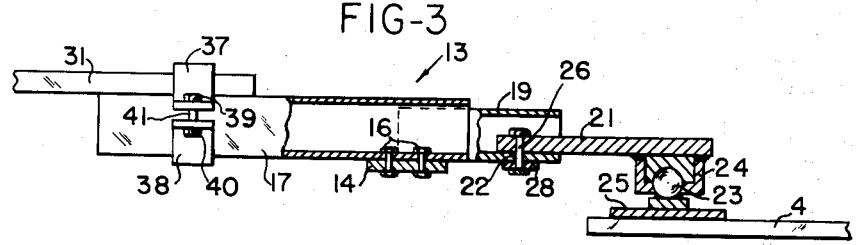
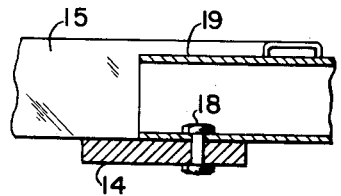
INVENTOR
THOMAS F. JACOBS
BY
ATTORNEYS

United States Patent Office 2,719,731
Patented Oct. 4, 1955

2,719,731

TRUCK HITCH FOR TOWING A VEHICLE BACKWARDS

Thomas F. Jacobs, Mount Sterling, Ohio, assignor to Kenosha Auto Transport Corporation, Springfield, Ohio, a corporation of Ohio Application June 9, 1952, Serial No. 292,521

7 Claims. (Cl. 280—402)

This invention relates to means for transporting motor vehicles. More particularly, the invention is concerned with a novel structural arrangement of a trailer hitch for the securing of one vehicle to another to facilitate delivery of the vehicles to dealers from the manufacturers or drive-away companies. Still more particularly the invention relates to a novel trailer hitch arrangement suitable for the towing of a vehicle in backwards relation to the towing vehicle.

In the transportation of vehicles in multiple, using only one powered vehicle and one driver, safety is a primary consideration in the mechanical arrangement of the vehicles. Thus it has been customary to provide a rigid towbar which connects to the rear end of a driving vehicle with the forward end of a towed vehicle. While such arrangements have been satisfactory in a general way they are disadvantageous in several respects. For example, a single span rigid towbar permits of some swivelling of the towed vehicle; also the usual towbar is connected with the forward end of the towed vehicle subjecting the windshield thereof to stones, etc. propelled upwardly by the towing vehicle, thus necessitating protective arrangements for the windshield. In such arrangements also it is general practice to demount the driving means of the towed vehicle, resulting in additional labor at each end of the transportation route.

It is accordingly a primary object of the present invention to provide a towbar or trailer hitch arrangement of improved safety characteristics.

It is also an object of this invention to provide a new and improved towbar or trailer hitch structure which may be readily secured to a towed vehicle without alteration of the vehicle.

It is another object of this invention to provide a towbar or trailer hitch arrangement which is readily demountable without destruction of the hitch and which accordingly permits repeated reuse of the hitch structure.

It is a further object of this invention to provide a towbar or trailer hitch structure which permits of the towing of the towed vehicle in backward relation to the towing vehicle without necessitating even temporary structural changes in the towed vehicle.

The invention accordingly comprises a novel structural arrangement of a trailer hitch in which a forked hollow member is pivotally secured to a towing vehicle and rigidly secured to the rear frame members of a towed vehicle. The height of the forked member above the ground is accordingly determined by the position of the securing means on the vehicles. Where desirable, for ease of installation of the hitch, the rear wheels of the towed vehicle may be removed and transported on the vehicle, being replaced at destination after removal of the hitch.

The invention and further objectives thereof will be apparent by reference to the following detailed description taken in connection with the accompanying drawings in which:

Figure 1 is a view in side elevation showing the manner in which one vehicle is secured to another in accordance with the precepts of this invention;

Figure 2 is a plan view of the trailer hitch arrangement of Figure 1;

Figure 3 is an elevational view partially in section of the structure illustrated in Figure 2;

Figure 4 is a perspective view of the novel trailer hitch in conformance with one embodiment of this invention;

Figure 5 is a sectional view taken on line 5—5 of Figure 2; and

Figure 6 is a modification of a portion of the structure shown in Figure 3.

Referring to the drawings there is shown in Figure 1 a towing truck 1 having a carried truck 3 mounted in a fixed position on a transverse member 5. Secured to the rear end of truck 1 is a towed vehicle 7 the forward end 9 of which faces in an opposite direction to that of the towing truck 1. Towing truck 1 and vehicle 7 are hitched together by a hollow forked member 13 and this securing arrangement is shown more clearly in Figure 2.

In Figure 2 it will be noted that hollow forked member 13 comprises spaced arms 15 and 17, plate 14, and a stem 19. Referring briefly to Figure 4 it will be noted that the cross section of each portion of member 13 is substantially rectangular. The arms and stem are suitably bolted to plate member 14 as at 16, 18 or the structure may be an integral one as shown in Figure 4.

Extending into the hollow opening of the stem 19 (Figures 2 and 3) is a tongue member 21 having an aperture 22 through which a bolt 26 may be passed to rigidly secure the tongue at one end thereof to stem 19 and a plate 28 positioned below the stem, as shown more clearly in Figure 3. At the right hand portion of the tongue member 21 a bearing member 23 engages with a socket 24 mounted on the upper portion of cross bracket 25 which is secured between frame members 2, 4 of the towing truck 1. Thus the member 21 and accordingly the forked member 13 may pivot with respect to cross bracket 25 and truck 1.

The arms 15 and 17 are each secured to frame members of the towed vehicle and as each securing means is similar specific reference will be made to only one of the assemblies. Thus as shown in Figures 2 and 3 the arm 17 is positioned beneath a longitudinal frame member 31 and plates 37, 38 assist in drawing the arm 17 and frame member 31 closely together by means of bolt 41 passing therethrough and tensioning nuts 39, 40. A second bolt 43 as indicated in Figure 2 passes through the same plates 37, 38 on the opposite side, the bolt being similarly secured by means of nuts as at 45. Similarly, the other forked member 15 is secured to frame member 33 which extends parallel with the frame member 31.

Where desired shimming blocks of wood 42 may be inserted between 37, 31 (as indicated in Figure 6) and between 38, 17. This arrangement insures that the rod member can be securely tightened down and rigid holding means are thereby attained.

In the structures shown in Figures 1 and 2 the pivot means for the rigid combination of hollow member 13 and tongue 21 is positioned on the upper side of the bracket 25. With the trailer hitch thus raised slightly in height it is not necessary to remove the rear wheels of truck 7 when transporting the same. In contrast thereto when the hitch and member 13 are positioned at a lower level as below bracket 25 it is generally desirable to demount the rear wheels and convey them on the vehicle.

It will be noted that upon arrival at destination the hitch may be detached from the vehicle by simply removing the nuts and bolts. No special tools are required and the whole apparatus is reusable repeatedly since it is not necessary to destroy any of the components when detaching the same.

Further, swivelling of the towed vehicle is substantially eliminated due to the firm engagement of each arm of the trailer hitch. Also no necessity exists to provide windshield 11 with special protection means.

While the hollow integral structure shown in Figure 4 may be employed the structure of Figure 2 affords a greater degree of flexibility as a number of bolt holes as at 16 may be drilled in plate 14 and the arms 15, 17 and stem 19 may be individually positioned for various conditions of attachment.

It will be understood that this invention is susceptible to modification in order to adopt it to different usages and conditions and accordingly, it is desired to comprehend such modifications within this invention as may fall within the scope of the appended claims.

I claim:

1. A trailer hitch secured between rearwardly extending parallel frame members of a towed motor vehicle and a pivot on a transversely extending support of a towing truck comprising spaced hollow substantially parallel arms extending in the direction of said frame members, the arms having upper flat surfaces and the frame members being spaced to overlap the arms and resting on the upper flat surfaces thereof, each arm having an end thereof secured to a said frame member, a plate member having the opposing ends of said arms secured thereto, a hollow stem secured to and extending from said plate member in the direction of said towing truck, and a tongue member pivotally secured to said towing vehicle and rigidly secured within the hollow of said stem.

2. In a hitch structure for the towing of a motor vehicle having rearwardly extending parallel frame members by a motor truck provided with a pivot on a transversely extending support member on the rear thereof, the combination with said vehicle and truck comprising spaced hollow substantially parallel arms which extend rearwardly of said truck in the direction of said frame members of said vehicle and are secured thereto, the arms having upper flat surfaces and the frame members being spaced to overlap the arms and resting on the upper flat surfaces thereof, a stem which extends forwardly towards said pivot and support member, means connecting the stem with the pivot, and means securing an adjacent end of each of said arms and said stem together thereby forming a forked member.

3. In a hitch structure for the towing of a motor vehicle having rearwardly extending parallel frame members by a motor truck provided with a pivot on a transversely extending support member on the rear thereof, the combination with said vehicle and truck comprising spaced hollow substantially parallel arms which extend rearwardly of said truck in the direction of said frame members of said vehicle and are secured thereto, the arms having upper flat surfaces and the frame members being spaced to overlap the arms and resting on the upper flat surfaces thereof, a stem which extends forwardly towards said pivot and support member to connect with the pivot, and a plate having secured thereto an adjacent end of each of said arms and said stem thereby forming a forked member.

4. In a hitch structure for the towing of a motor vehicle having rearwardly extending parallel frame members by a motor truck provided with a pivot on a transversely extending support member on the rear thereof, the combination with said vehicle and truck comprising hollow spaced substantially parallel arms which extend rearwardly of said truck in the direction of said frame members of said vehicle and are secured thereto, the arms having upper flat surfaces and the frame members being spaced to overlap the arms and resting on the upper flat surfaces thereof, a hollow stem which extends forwardly towards said pivot and support, means connecting the stem with the pivot, and a plate having secured thereto an adjacent end of each of said arms and said hollow stem thereby forming a forked member.

5. In a hitch structure for the towing of a motor vehicle having rearwardly extending parallel frame members by a motor truck provided with a pivot on a transversely extending support member on the rear thereof, the combination with said vehicle and truck comprising hollow spaced substantially parallel arms which extend rearwardly of said truck in the direction of said frame members of said vehicle, the arms having upper flat surfaces and the frame members being spaced to overlap the arms and resting on the upper flat surfaces thereof, a hollow stem which extends forwardly towards said pivot and support, a plate having secured thereto an adjacent end of each of said arms and said stem thereby forming a forked member, means individually securing the other end of each of said arms to a said frame member, and means securing said stem to said pivot.

6. In a hitch structure for the towing of a motor vehicle having rearwardly extending parallel frame members by a motor truck provided with a pivot on a transversely extending support on the rear thereof, the combination with said vehicle and truck comprising spaced hollow substantially parallel arms which extend rearwardly of said truck in the direction of said frame members of said vehicle and are secured thereto, the arms having upper flat surfaces and the frame members being spaced to overlap the arms and resting on the upper flat surfaces thereof, a stem which extends forwardly towards said pivot and support to connect with said pivot, and means defining a hollow portion securing an adjacent end of each of said arms and said stem together thereby forming a forked member.

7. In a hitch structure for the towing of a motor vehicle having rearwardly extending parallel frame members by a motor truck provided with a pivot on a transversely extending support member on the rear thereof, the combination with said vehicle and truck comprising hollow spaced substantially parallel arms which extend rearwardly of said truck in the direction of said frame members of said vehicle, the arms having upper flat surfaces and the frame members being spaced to overlap the arms and resting on the upper flat surfaces thereof, a hollow stem which extends forwardly towards said pivot and support, a plate having secured thereto an adjacent end of each of said arms and said stem thereby forming a forked member, means including shimming means individually securing the other end of each of said arms to a said frame member, and means securing said stem to said pivot.

References Cited in the file of this patent

UNITED STATES PATENTS

| | | |
|---|---|---|
| 1,478,041 | Lorenz | Dec. 18, 1923 |
| 1,851,349 | Cowles | Mar. 29, 1932 |
| 2,133,202 | Lanz | Oct. 11, 1938 |
| 2,447,250 | Holloway | Aug. 17, 1948 |
| 2,574,276 | Mills | Nov. 6, 1951 |
| 2,635,892 | Shutter | Apr. 21, 1953 |

FOREIGN PATENTS

| | | |
|---|---|---|
| 122,982 | Great Britain | Feb. 13, 1919 |